United States Patent
Höglund et al.

(10) Patent No.: US 12,452,814 B2
(45) Date of Patent: *Oct. 21, 2025

(54) PRECONFIGURED UPLINK RESOURCES—CONFIGURATION FOR TA VALIDITY IN ENTIRE CELL

(71) Applicant: Telefonaktiebolaget LM Ericsson (publ), Stockholm (SE)

(72) Inventors: Andreas Höglund, Solna (SE); Gerardo Agni Medina Acosta, Märsta (SE); Sandeep Narayanan Kadan Veedu, Täby (SE); Emre Yavuz, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/393,131

(22) Filed: Dec. 21, 2023

(65) Prior Publication Data

US 2024/0129873 A1    Apr. 18, 2024

Related U.S. Application Data

(63) Continuation of application No. 17/599,285, filed as application No. PCT/IB2020/052970 on Mar. 27, 2020, now Pat. No. 11,930,467.

(Continued)

(51) Int. Cl.
*H04W 56/00* (2009.01)
(52) U.S. Cl.
CPC ............................ *H04W 56/0045* (2013.01)
(58) Field of Classification Search
CPC ........ G01S 13/765; G01S 5/0205; G01S 5/10; G01S 1/20; G01S 11/06; G01S 13/75;

(Continued)

(56) References Cited

U.S. PATENT DOCUMENTS 10,667,323 B1 *   5/2020   Shih ..................... H04W 76/27
11,470,488 B1 * 10/2022   Babaei ................. H04W 76/27
(Continued)

FOREIGN PATENT DOCUMENTS

WO    2013051989 A1    4/2013
WO    2017155601 A1    9/2017
WO    2020165183 A1    8/2020

OTHER PUBLICATIONS

Author Unknown, "3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331 V15.2.2, Jun. 2018, 3GPP Organizational Partners, 791 pages.
Ericsson, "RP-190532: Revised WID: Additional MTC enhancements for LTE," 3GPP TSG RAN meeting #83, Mar. 18-21, 2019, Shenzhen, China, 5 pages.
Ericsson, "Tdoc R2-1903831: PUR TA validation & Release," 3GPP TSG-RAN WG2 #105bis, Apr. 8-12, 2019, Xi'An, China, 5 pages.

(Continued)

*Primary Examiner* — Nathan S Taylor
(74) *Attorney, Agent, or Firm* — Withrow & Terranova, PLLC

(57) ABSTRACT

Systems and methods for determining timing advance (TA) validity are disclosed. In some embodiments, systems and methods are disclosed herein in which a wireless device implicitly considers a TA to be valid in a full cell when no TA validation mechanisms are explicitly configured. In other embodiments, systems and methods are disclosed herein in which a timer serves a dual purpose. If the timer is set to infinity, a wireless device will always consider a TA to be valid within a given cell, and at the same time will disable other TA validation mechanisms. Otherwise, the wireless device will interpret the timer as indicating for how long the TA value that the wireless device possesses is considered to be valid. Benefits of the solutions described herein include reducing signaling bits in the configuration and avoiding the possibility of conflicting configurations.

15 Claims, 6 Drawing Sheets

Related U.S. Application Data

(60) Provisional application No. 62/826,580, filed on Mar. 29, 2019.

(58) Field of Classification Search
CPC .. G01S 13/76; G01S 5/02; G01S 5/06; H04W 56/009; H04W 64/003; H04W 64/006; H04W 56/00; H04W 64/00; H04W 24/02; H04W 24/10; H04W 4/02; H04W 4/33; H04W 88/00; H04W 52/0206; H04W 52/0212; H04W 52/0225; H04W 52/0251; H04W 52/0229; H04W 84/12; H04W 88/06; H04W 52/02; H04W 56/0045; H04L 43/106; H04L 5/00; H04B 17/27
See application file for complete search history.

(56) References Cited

U.S. PATENT DOCUMENTS

| | | | | |
|---|---|---|---|---|
| 11,528,629 | B1* | 12/2022 | Yerramalli | H04W 76/20 |
| 2015/0181481 | A1* | 6/2015 | Masini | H04W 36/322 |
| | | | | 455/436 |
| 2018/0124648 | A1* | 5/2018 | Park | H04W 36/0011 |
| 2018/0279262 | A1* | 9/2018 | Babaei | H04L 1/1848 |
| 2018/0368107 | A1* | 12/2018 | Babaei | H04W 76/00 |
| 2018/0368132 | A1* | 12/2018 | Babaei | H04W 76/11 |
| 2019/0098533 | A1* | 3/2019 | Babaei | H04L 1/08 |
| 2019/0208436 | A1* | 7/2019 | Zhou | H04L 1/0009 |
| 2020/0037248 | A1* | 1/2020 | Zhou | H04L 5/0032 |
| 2020/0107283 | A1* | 4/2020 | Ratasuk | H04L 27/2646 |
| 2020/0137760 | A1* | 4/2020 | Shih | H04W 72/53 |
| 2020/0137761 | A1* | 4/2020 | Shih | H04W 76/11 |
| 2020/0170069 | A1* | 5/2020 | Shih | H04W 76/19 |
| 2020/0196264 | A1* | 6/2020 | Shih | H04W 74/0833 |
| 2020/0260397 | A1* | 8/2020 | Vos | H04L 5/003 |
| 2021/0392659 | A1* | 12/2021 | Tirronen | H04W 72/535 |
| 2022/0007391 | A1* | 1/2022 | Höglund et al. | H04W 72/1268 |
| 2022/0038997 | A1* | 2/2022 | Höglund | H04W 48/06 |
| 2022/0085942 | A1* | 3/2022 | Kim | H04W 72/04 |
| 2022/0132445 | A1* | 4/2022 | Kim | H04W 56/0045 |
| 2022/0312406 | A1* | 9/2022 | Kim | H04L 1/1861 |

OTHER PUBLICATIONS

Huawei, "R1-1901503: Transmission in preconfigured UL resources," 3GPP TSG RAN WG1 Meeting #96, Feb. 25-Mar. 1, 2019, Athens, Greece, 11 pages.

Huawei, "R1-1903254: Feature lead summary of Support for transmission in preconfigured UL resources," 3GPP TSG RAN WG1 Meeting #96, Feb. 25-Mar. 1, 2019, Athens, Greece, 23 pages.

Huawei, "RP-190337: WID revision: Additional enhancements for NB-IoT," 3GPP TSG RAN meeting #83, Mar. 18-21, 2019, Shenzhen, China, 4 pages.

Sierra Wireless, "R1-1810490: NB-Iot Pre-configed UL Resources Design Considerations," 3GPP TSG RAN WG1 Meeting #94bis, Oct. 8-12, 2018, Chengdu, China, 9 pages.

Sierra Wireless, "R1-1903293: LTE-M Preconfigured UL Resources offline conclusion and remain issues," 3GPP TSG RAN WG1 #96, Feb. 25-Mar. 1, 2019, Athens, Greece, 6 pages.

Office Action for Canadian Patent Application No. 3132495, mailed Oct. 28, 2022, 3 pages.

Office Action for Canadian Patent Application No. 3132495, mailed Jul. 12, 2023, 5 pages.

Office Action for Colombian Patent Application No. NC2021/0009359, mailed Dec. 29, 2023, 22 pages.

Examination Report for Indian Patent Application No. 202147048762, mailed Dec. 8, 2022, 6 pages.

International Search Report and Written Opinion for International Patent Application No. PCT/IB2020/052970, mailed Jul. 16, 2020, 15 pages.

Non-Final Office Action for U.S. Appl. No. 17/599,285, mailed Feb. 9, 2023, 24 pages.

Final Office Action for U.S. Appl. No. 17/599,285, mailed May 25, 2023, 28 pages.

Advisory Action for U.S. Appl. No. 17/599,285, mailed Aug. 3, 2023, 5 pages.

Notice of Allowance for U.S. Appl. No. 17/599,285, mailed Sep. 14, 2023, 14 pages.

* cited by examiner

PRECONFIGURED UPLINK RESOURCES—CONFIGURATION FOR TA VALIDITY IN ENTIRE CELL

RELATED APPLICATIONS

This application is a continuation of U.S. patent application Ser. No. 17/599,285, filed Sep. 28, 2021, which is a 35 U.S.C. § 371 national phase filing of International Application PCT/IB2020/052970, filed Mar. 27, 2020, which claims the benefit of provisional patent application Ser. No. 62/826,580, filed Mar. 29, 2019, the disclosures of which are hereby incorporated herein by reference in their entireties.

TECHNICAL FIELD

The present disclosure relates to techniques for determining timing advance (TA) validity in user equipment (UE) devices.

BACKGROUND

There has been a lot of work in the Third Generation Partnership Project (3GPP) on specifying technologies to cover Machine-to-Machine (M2M) and/or Internet of Things (IoT)-related use cases. Most recent work for 3GPP Releases 13, 14, and 15 includes enhancements to support Machine-Type Communications (MTC) with new User Equipment (UE) categories (Cat-M1, Cat-M2), supporting reduced bandwidth of up to 6 and 24 physical resource blocks (PRBs), and Narrowband IoT (NB-IoT) UEs providing a new radio interface (and UE categories Cat-NB1 and Cat-NB2).

The Long Term Evolution (LTE) enhancements introduced in 3GPP Release 13, 14, and 15 for MTC are referred to herein as "eMTC", including (but not limited to) support for bandwidth limited UEs, Cat-M1, and support for coverage enhancements. This is to separate discussions from NB-IoT (notation here used for any 3GPP Release), although the supported features are similar on a general level.

For both eMTC and NB-IoT, "CIoT Evolved Packet System (EPS) UP optimization" and "CIoT EPS CP optimization" signaling reductions were also introduced in Release 13. The former, which is referred to herein as a User Plane (UP) solution (UP-solution), allows the UE to resume a previously stored Radio Resource Control (RRC) connection (thus also known as RRC Suspend/Resume). The latter, which is referred to herein as a Control Plane (CP) solution (CP-solution), allows the transmission of user-plane data over Non-Access Stratum (NAS) (DoNAS).

There are multiple differences between "legacy" LTE and the procedures and channels defined for eMTC and for NB-IoT. Some important differences include a new physical channel, such as the physical downlink control channels (which are MTC Physical Downlink Control Channel (MPDCCH) in eMTC and Narrowband Physical Downlink Control Channel (NPDCCH) in NB-IoT), and a new physical random access channel (called Narrowband Physical Random Access Channel (NPRACH)) for NB-IoT. Another important difference is the coverage level (also known as coverage enhancement level) that these technologies can support. By applying repetitions to the transmitted signals and channels, both eMTC and NB-IoT allow UE operation down to a much lower Signal to Noise Ratio (SNR) level compared to LTE, i.e., $Es/IoT \geq -15$ dB being the lowest operating point for eMTC and NB-IoT, which can be compared to $-6$ dB Es/IoT for "legacy" LTE.

As noted in the portion of the 3GPP Technical Specification Group (TSG) Radio Access Network (RAN) Meeting Contribution Document ("TDoc") R2-1903831 excerpted in Table 1 below, the Release 16 Work Item Descriptions (WIDs) for LTE-M and NB-IoT contain a common objective on improving the uplink transmission efficiency and/or UE power consumption by means of transmission in preconfigured resources:

TABLE 1

Improved UL transmission efficiency and/or UE power consumption:
  Specify support for transmission in preconfigured resources
  in idle and/or connected mode based on SC-FDMA waveform for
  UEs with a valid timing advance[RAN1, RAN2, RAN4]
    Both shared resources and dedicated resources can be discussed
    Note: This is limited to orthogonal (multi) access schemes Regarding the use of timing advance (TA), 3GPP has agreed on the following, as noted in the portion of the 3GPP TSG-RAN TDoc R2-1903831 excerpted in Table 2:

TABLE 2

Agreement
In idle mode, the UE will at least consider one or more of the following attributes when
validating TA (combination of multiple attributes is allowed):
  Serving cell changes (serving cell refers the cell that the UE is camping on)
  Time Alignment Timer for idle mode
  Serving cell RSRP changes (serving cell refers the cell that the UE is camping on)
  FFS Other attributes:
    Neighbour cell RSRP change
    TDOA of >=2 eNBs
    TA History
    Subscription based UE differentiation
    Others not precluded (for example, attributes that need to be considered
    for high mobility UEs)
Note that UE power consumption should be taken into account for the FFS attributes
Agreement
For transmission in preconfigured UL resources, an RRC idle UE may use the latest TA
that passed the validation criteria
Agreement
In idle mode, at least the following TA validation attributes are supported:
  Serving cell changes (serving cell refers the cell that the UE is camping on)
  Time Alignment Timer for idle mode TABLE 2-continued Serving cell (N)RSRP changes (serving cell refers the cell that the UE is camping on)
  Based on (N)RSRP measurement definition in existing Rel-15 TS36.214
Agreement
The UE can be configured to use at least these TA validation attributes:
  Time Alignment Timer for idle mode
  Serving cell RSRP changes
  Note: the configuration shall support disabling of the TA validation attributes
Agreement
Include in LS to RAN2, RAN4:
RAN1 assumes that a UE transitioning from EDT/connected to idle mode can use the
valid TA that was used while in EDT/connected mode.
Agreement
In idle mode, the TA validation configuration can include "PUR Time Alignment Timer"
  Where the UE considers the TA as invalid if the (current time − time at last TA
  update) > the PUR Time Alignment Timer
  Details on how to specify the "PUR Time Alignment Timer" is up to RAN2
Agreement
In idle mode, when the UE validates TA, the UE considers the TA for the previous
serving cell as invalid if the serving cell changes
  Above applies for the case where the UE is configured to use the serving cell
  change attribute
Agreement
When the TA is validated and found to be invalid and the UE has data to send, the UE
can obtain a valid TA and may send data via legacy RACH or EDT procedures
  FFS whether only TA is acquired and then data sent on PUR is supported
  FFS other approaches to obtain a valid TA
Agreement
When the UE is configured to use several TA validation criteria, the TA is valid only
when all the configured TA validation criteria are satisfied.
Agreement
In idle mode, a UE can be configured such that TA is always valid within a given cell.
  FFS: up to RAN2 how to implement e.g. PUR Time Alignment Timer = infinity Dedicated preconfigured uplink resources (PUR) are referred to herein as D-PUR. So far, it has been agreed that D-PUR in RRC Idle mode will be supported, and likely both with periodic configurations and configuration for one D-PUR transmission only, also referred to as "one-shot D-PUR".

There currently exist certain challenge(s). It has been agreed for PUR that it should be configurable to have the TA to be valid in the entire cell, as noted in the portion of the 3GPP TSG-RAN TDoc R2-1903831 excerpted in Table 3:

TABLE 3

In idle mode, a UE can be configured such that TA is always valid
within a given cell.
  FFS: up to RAN2 how to implement e.g. PUR Time Alignment
  Timer = infinity The problem is that setting the PUR Time Alignment Timer to infinity to disable the TA timer validation mechanism cannot be used as a way to indicate that the TA is always valid within the cell if the other validation mechanisms remain configured.

SUMMARY

Systems and methods for determining timing advance (TA) validity are disclosed herein. Embodiments of a method performed by a wireless device of a cellular communications system to determine TA validity are disclosed herein. In some embodiments, the method comprises obtaining a TA for a cell of the cellular communications system, and determining that none of a predefined set of TA validation mechanisms are configured. The method further comprises, responsive to determining that none of the predefined set of TA validation mechanisms are configured, determining that the TA is valid for an entirety of the cell. In some embodiments, the predefined set of TA validation mechanisms comprises one or more optional TA validation mechanisms (e.g., TA validation criteria or methods that are configurable, such as Time Alignment Timer for idle mode and/or serving cell Reference Signal Received Power (RSRP) or Narrowband RSRP (NRSRP) changes, as non-limiting examples). In some embodiments, the method further comprises performing one or more uplink transmissions using the TA. In some embodiments, performing the one or more uplink transmissions using the TA comprises performing the one or more uplink transmissions on one or more preconfigured uplink resources.

Embodiments of a wireless device of a cellular communications system enabled to determine TA validity are also disclosed herein. In some embodiments, the wireless device comprises processing circuitry coupled to a memory. The processing circuitry is configured to obtain a TA for a cell of the cellular communications system, and determine that none of a predefined set of TA validation mechanisms are configured. The processing circuitry is further configured to, responsive to determining that none of the predefined set of TA validation mechanisms are configured, determine that the TA is valid for an entirety of the cell. In some embodiments, the wireless device is further configured to perform any of the steps attributed to the wireless device in the above-disclosed methods.

Embodiments of a method performed by a wireless device of a cellular communications system to determine TA validity are also disclosed herein. In some embodiments, the method comprises obtaining a TA for a cell, and receiving one or more configurations of a corresponding one or more TA validation mechanisms. The method further comprises receiving a first timer, and determining that the first timer is set to infinity. The method also comprises, responsive to determining that the first timer is set to infinity, determining that the TA is valid for an entirety of the cell, and, responsive to determining that the TA is valid for the entirety of the cell, disabling the one or more TA validation mechanisms.

In some embodiments, the one or more TA validation mechanisms comprises one or more optional TA validation mechanisms. In some embodiments, the first timer comprises a Preconfigured Uplink Resources (PUR) Time Alignment Timer. In some embodiments, the method further comprises, responsive to determining that the timer is set to infinity, performing one or more uplink transmissions using the TA. In some embodiments, performing the one or more uplink transmissions using the TA comprises performing the one or more uplink transmissions using the TA on one or more PUR resources.

In some embodiments, the method further comprises receiving a second timer, and determining that the second timer is not set to infinity. The method also comprises, responsive to determining that the second timer is not set to infinity, interpreting the second timer as an indication of how long the TA is considered valid. In some embodiments, the method further comprises, responsive to determining that the second timer is not set to infinity, performing one or more uplink transmissions using the TA while the second timer is running and the TA is valid as determined by the UE using the one or more TA validation mechanisms. In some embodiments, performing the one or more uplink transmissions using the TA comprises performing the one or more uplink transmissions using the TA on one or more PUR resources.

Embodiments of a wireless device of a cellular communications system enabled to determine TA validity are also disclosed herein. In some embodiments, the wireless device comprising processing circuitry coupled to a memory. The processing circuitry is configured to obtain a TA for a cell, and receive one or more configurations of a corresponding one or more TA validation mechanisms. The processing circuitry is further configured to receive a first timer, and determine that the first timer is set to infinity. The processing circuitry is also configured to, responsive to determining that the first timer is set to infinity, determine that the TA is valid for an entirety of the cell, and, responsive to determining that the TA is valid for the entirety of the cell, disable the one or more TA validation mechanisms. In some embodiments, the processing circuitry is further configured to perform any of the steps attributed to the wireless device in the above-disclosed methods.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
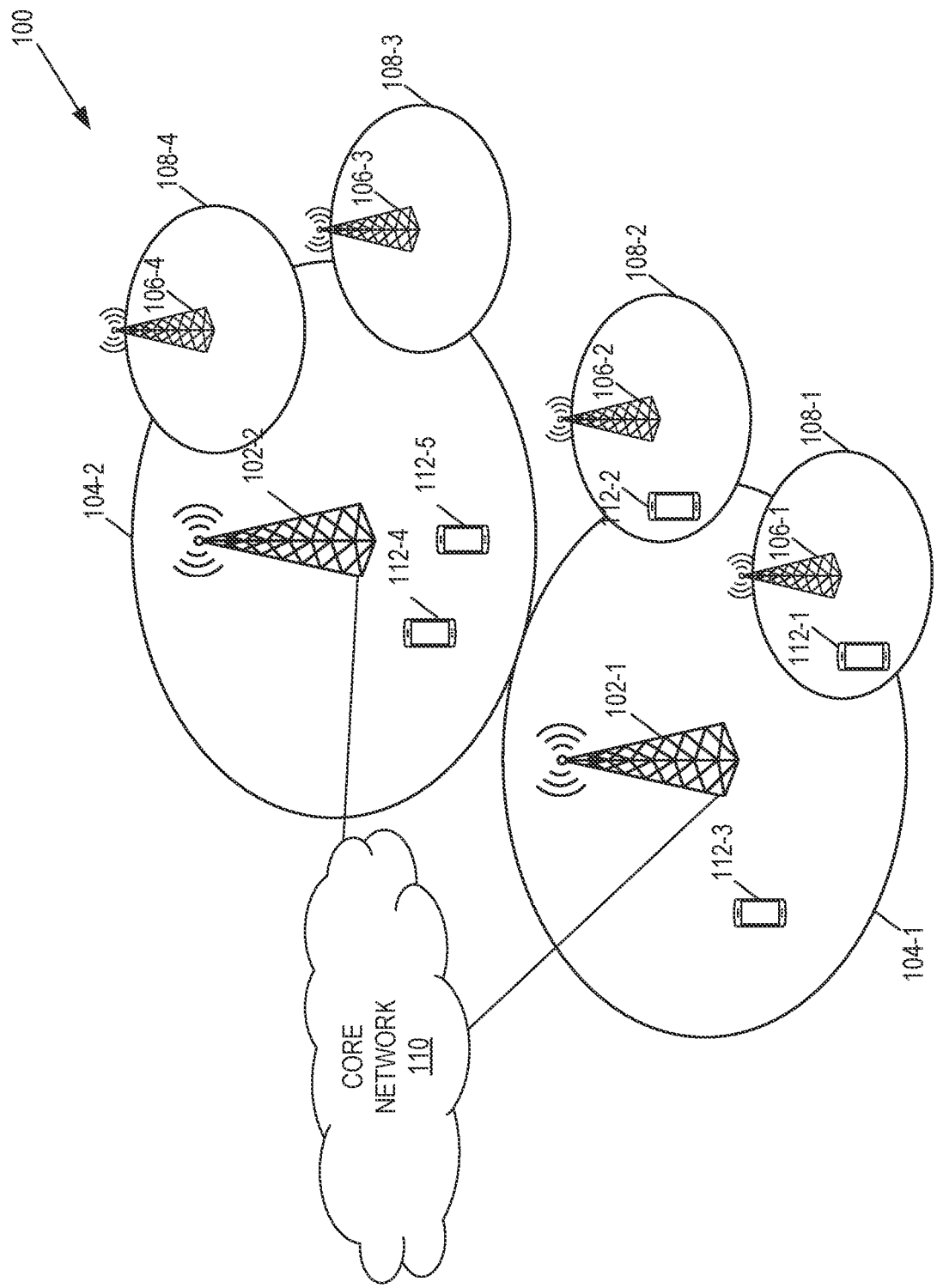
FIG. 1 illustrates one example of a cellular communications system according to some embodiments of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

In some embodiments, systems and methods are disclosed herein for providing an implicit method to indicate that a timing advance (TA) is always valid in the entire cell. The idea is that the TA is implicitly valid in the full cell when no TA validation mechanisms are explicitly configured. In some other embodiments, systems and methods are disclosed herein in which a timer, such as a Preconfigured Uplink Resources (PUR) Time Alignment Timer, serves a dual purpose. If the PUR Time Alignment Timer is set to infinity, it indicates that the TA is always valid within a given cell, and at the same time serves as a disabler of other TA validation mechanisms (i.e., a "Time Alignment Timer" set to infinity automatically disables other TA validation methods). Otherwise, the PUR Time Alignment Timer indicates for how long the TA value that the UE possesses is considered to be valid. Benefits of the solution described herein include reducing signaling bits in the configuration and avoiding the possibility of conflicting configurations.

FIG. 1 illustrates one example of a cellular communications system 100 in which embodiments of the present disclosure may be implemented. The cellular communications system 100 includes a radio access network (RAN) that includes base stations 102-1 and 102-2, which in LTE are referred to as eNBs and in 5G NR are referred to as gNBs, controlling corresponding macro cells 104-1 and 104-2. The base stations 102-1 and 102-2 are generally referred to herein collectively as base stations 102 and individually as base station 102. Likewise, the macro cells 104-1 and 104-2 are generally referred to herein collectively as macro cells 104 and individually as macro cell 104. The RAN may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The cellular communications system 100 also includes a core network 110, where the base stations 102 (and optionally the low power nodes 106) are connected to the core network 110.

The base stations 102 and the low power nodes 106 provide service to wireless devices 112-1 through 112-5 in the corresponding cells 104 and 108. The wireless devices 112-1 through 112-5 are generally referred to herein collectively as wireless devices 112 and individually as wireless device 112. The wireless devices 112 are also sometimes referred to herein as UEs.

Now, the description turns to a discussion of the details of some example embodiments of the present disclosure.

In 3GPP, RAN1 has agreed that a PUR UE "may use the latest TA that passed the validation criteria", where the validation criteria are 1) Serving cell changes (i.e., cell re-selection), 2) Idle Time Alignment Timer, and 3) Serving cell RSRP changes. Since, according to the WI-objective, "UEs with a valid timing advance" can use PUR, a UE is allowed to use PUR for transmission if it can fulfill the above criteria. Further, it has been agreed that the last two validation mechanisms should be configurable.

Further, it has been agreed that it should be configurable if the TA is always valid within a given cell, as noted in the portion of the 3GPP TSG-RAN TDoc R2-1903831 excerpted in Table 4:

TABLE 4

Agreement
In idle mode, a UE can be configured such that TA is always valid within a given cell.
   FFS: up to RAN2 how to implement e.g. PUR Time Alignment Timer = infinity The proposed example solution by RAN1, i.e., setting the TA timer to infinity, cannot be used as a way to indicate that the TA is always valid within the cell if other TA validation mechanisms remain configured and still apply. The idea is therefore that the configurable TA validation mechanisms are specified as optional and, if they are not included, the TA will implicitly always be valid in the cell.

Note that the following agreement states what the behavior is when there are TA criteria configured in the cell, but not what the behavior is when there are no TA criteria configured, as noted in the portion of the 3GPP TSG-RAN TDoc R2-1903831 excerpted in Table 5:

TABLE 5

Agreement
When the UE is configured to use several TA validation criteria, the TA is valid only when all the configured TA validation criteria are satisfied.

In an example embodiment of the present disclosure, the following text shown in Table 6 is added to the specification:

TABLE 6

"when no TA validation methods are configured, the UE shall assume that the TA is always valid within the cell".

As part of the present disclosure, the TA validation criteria are configured as "optional" in system information broadcasts. It is noted that this refers to the TA validation criteria or methods that are configurable, i.e., likely excluding the "Serving cell changes (i.e., cell re-selection)" above. Further, it is noted that configuring the TA timer to a value of "infinity" is effectively disabling this criterion since the timer will never time out, as described in further detail below.

Figure 2:
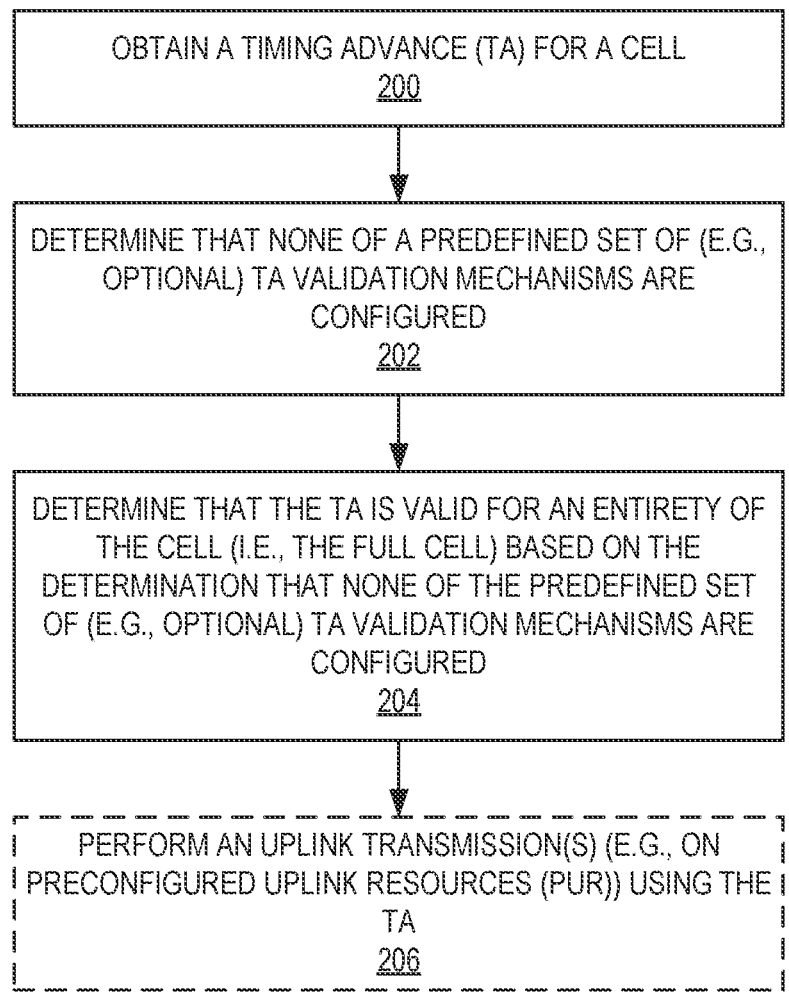
FIG. 2 is a flowchart illustrating exemplary operations that may be performed by a wireless device of a cellular communications system to determine timing advance (TA) validity, according to some embodiments of the present disclosure.

In this regard, FIG. 2 is a flow chart that illustrates a method performed by a UE (e.g., a wireless device 112) in accordance with at least some of the embodiments described above. As illustrated, the UE obtains a TA for a cell (step 200). The UE may obtain the TA for the cell in any suitable manner, e.g., in the conventional manner by receiving a TA sent by a base station 102 or 106. The UE determines that none of a predefined set of (e.g., optional) TA validation mechanisms are configured (step 202). The UE determines that the TA is valid for an entirety of the cell (i.e., the full cell) based on the determination that none of the predefined set of (e.g., optional) TA validation mechanisms are configured (step 204). Optionally, the UE uses the (valid) TA for an uplink transmission(s) (e.g., on PUR) (step 206).

Alternatively, if a timer such as the "PUR Time Alignment Timer" is used to indicate that the TA is always valid within a given cell, a rule can be introduced stating that when the "Time Alignment Timer" is set to infinity, any other TA validation method is disabled (i.e., a "Time Alignment Timer" set to infinity automatically disables other TA validation methods).

Hence in one embodiment the "Time Alignment Timer" serves a dual purpose:

If the "PUR Time Alignment Timer" is set to infinity, it indicates that the TA is always valid within a given cell, and at the same time serves as a disabler of other TA validation mechanisms.

A "Time Alignment Timer" set to infinity automatically disables other TA validation methods (e.g., Serving cell (N)RSRP changes).

Otherwise (i.e., when the "Time Alignment Timer" is not set to infinity), it indicates for how long (how much time) the TA value that a given UE possesses can still be considered as valid.

Note that this excludes the first TA validation mechanism (i.e., Serving cell changes or cell re-selection), since if the UE has a serving cell change, it does not matter if the TA is always valid in the source cell. Hence the first TA validation mechanism is not configurable and always applies.

Figure 3:
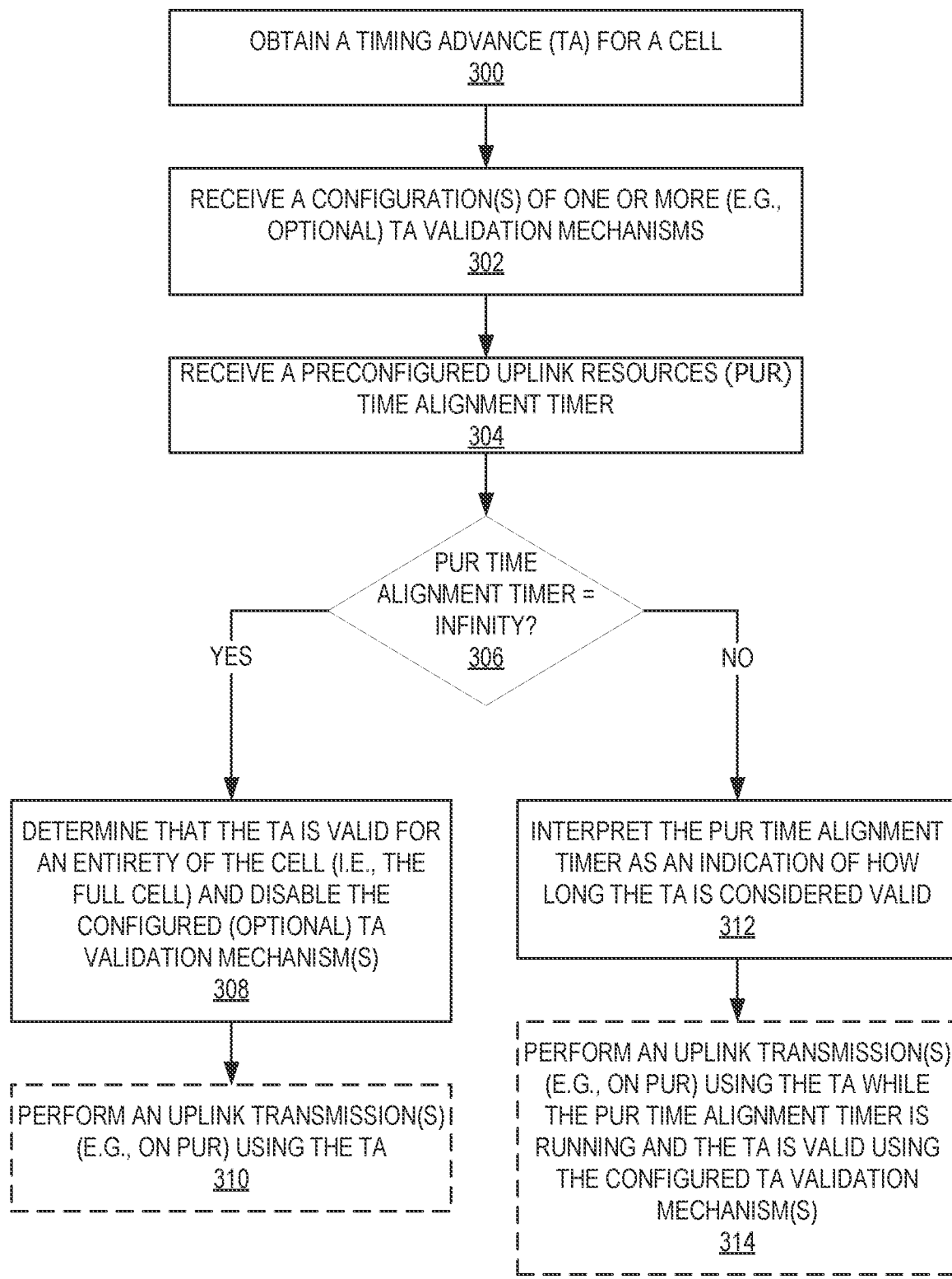
FIG. 3 is a flowchart illustrating exemplary operations that may be performed by a wireless device of a cellular communications system to determine TA validity, according to further embodiments of the present disclosure.

FIG. 3 is a flow chart that illustrates the operation of a UE (e.g., a wireless device 112) in accordance with at least some aspects of the embodiment described above. As illustrated, the UE obtains a TA for a cell (step 300). The UE may obtain the TA for the cell in any suitable manner, e.g., in the conventional manner by receiving a TA sent by a base station 102 or 106. The UE receives, from a network node (e.g., a base station serving the cell), a configuration(s) of one or more (optional) TA validation mechanisms (step 302). The UE also receives, from the network node (e.g., the base station serving the cell), a PUR Time Alignment Timer (step 304). Note that while the name "PUR Time Alignment Timer" is used herein for this timer, this name is not to be construed in a limiting manner; instead, this name should be construed to encompass any timer, regardless of its name, that provides the same functionality as the "PUR Time Alignment Timer" described herein. For example, while the current 3GPP agreements use the term "PUR Time Alignment Timer" in the agreements discussed herein, the actual name used for this timer in the resulting 3GPP standards may vary.

The UE determines whether the PUR Time Alignment Timer is set to infinity (step 306). If so (step 306, YES), the UE determines that the TA is valid for an entirety of the cell and disables the one or more (optional) TA validation mechanisms that have been configured for the UE (step 308). In other words, the UE uses the PUR Time Alignment Timer set to infinity as an indication to disable any (optional) TA validation mechanisms that have been configured for the UE. Optionally, the UE uses the (valid) TA for an uplink transmission(s) (e.g., on PUR) (310).

If the PUR Time Alignment Timer is not set to infinity (step 306, NO), the UE interprets the PUR Time Alignment Timer as an indication of how long the TA is considered valid (step 312). Optionally, the UE uses the TA for an uplink transmission(s) (e.g., on PUR) while the PUR Time Alignment Timer is running (and the TA is validated using the TA validation mechanism(s) configured in step 302) (step 314).

Figure 4:
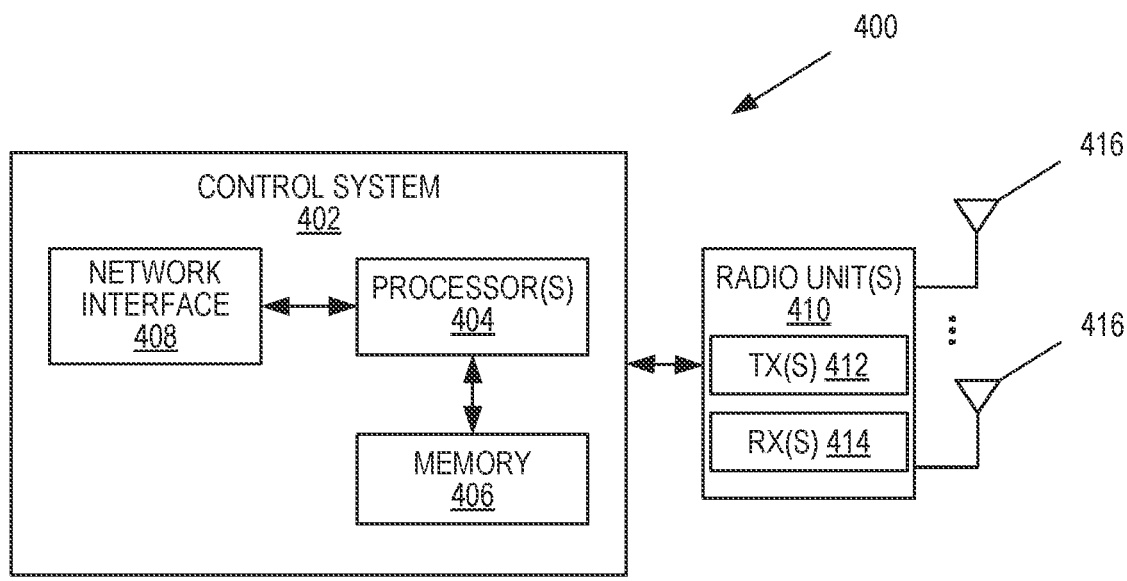
FIG. 4 is a schematic block diagram of a radio access node according to some embodiments of the present disclosure.

FIG. 4 is a schematic block diagram of a radio access node 400 according to some embodiments of the present disclosure. The radio access node 400 may be, for example, a base station 102 or 106. As illustrated, the radio access node 400 includes a control system 402 that includes one or more processors 404 (e.g., Central Processing Units (CPUs), Application Specific Integrated Circuits (ASICs), Field Programmable Gate Arrays (FPGAs), and/or the like), a memory 406, and a network interface 408. The one or more processors 404 are also referred to herein as processing circuitry. In addition, the radio access node 400 includes one or more radio units 410 that each includes one or more transmitters 412 and one or more receivers 414 coupled to one or more antennas 416. The radio units 410 may be referred to as or be part of radio interface circuitry. In some embodiments, the radio unit(s) 410 is external to the control system 402 and connected to the control system 402 via, e.g., a wired connection (e.g., an optical cable). However, in some other embodiments, the radio unit(s) 410 and potentially the antenna(s) 416 are integrated together with the control system 402. The one or more processors 404 operate to provide one or more functions of the radio access node 400 as described herein. In some embodiments, the function(s) are implemented in software that is stored, e.g., in the memory 406 and executed by the one or more processors 404.

Figure 5:
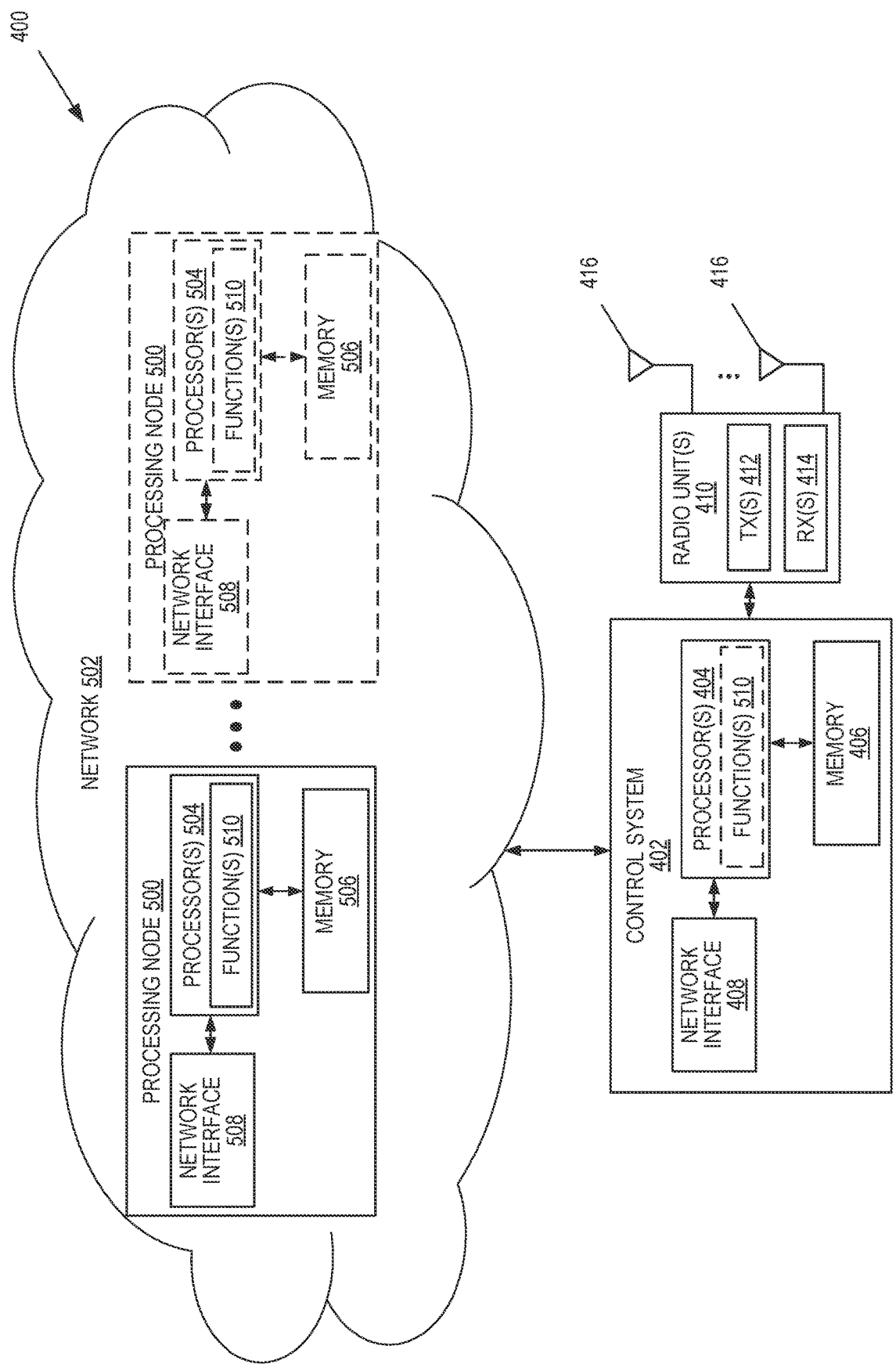
FIG. 5 is a schematic block diagram that illustrates a virtualized embodiment of the radio access node of FIG. 4 according to some embodiments of the present disclosure.

FIG. 5 is a schematic block diagram that illustrates a virtualized embodiment of the radio access node 400 according to some embodiments of the present disclosure. This discussion is equally applicable to other types of network nodes. Further, other types of network nodes may have similar virtualized architectures.

As used herein, a "virtualized" radio access node is an implementation of the radio access node 400 in which at least a portion of the functionality of the radio access node 400 is implemented as a virtual component(s) (e.g., via a virtual machine(s) executing on a physical processing node(s) in a network(s)). As illustrated, in this example, the radio access node 400 includes the control system 402 that includes the one or more processors 404 (e.g., CPUs, ASICs, FPGAs, and/or the like), the memory 406, the network interface 408, and the one or more radio units 410 that each includes the one or more transmitters 412 and the one or more receivers 414 coupled to the one or more antennas 416, as described above. The control system 402 is connected to the radio unit(s) 410 via, for example, an optical cable or the like. The control system 402 is connected to one or more processing nodes 500 coupled to or included as part of a network(s) 502 via the network interface 408. Each processing node 500 includes one or more processors 504 (e.g., CPUs, ASICs, FPGAs, and/or the like), a memory 506, and a network interface 508.

In this example, function(s) 510 of the radio access node 400 described herein are implemented at the one or more processing nodes 500 or distributed across the control system 402 and the one or more processing nodes 500 in any desired manner. In some particular embodiments, some or all of the function(s) 510 of the radio access node 400 described herein are implemented as virtual components executed by one or more virtual machines implemented in a virtual environment(s) hosted by the processing node(s) 500. As will be appreciated by one of ordinary skill in the art, additional signaling or communication between the processing node(s) 500 and the control system 402 is used in order to carry out at least some of the desired function(s) 510. Notably, in some embodiments, the control system 402 may not be included, in which case the radio unit(s) 410 communicates directly with the processing node(s) 500 via an appropriate network interface(s).

In some embodiments, a computer program including instructions which, when executed by at least one processor, causes the at least one processor to carry out the functionality of radio access node 400 or a node (e.g., a processing node 500) implementing one or more of the functions 510 of the radio access node 400 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 6:
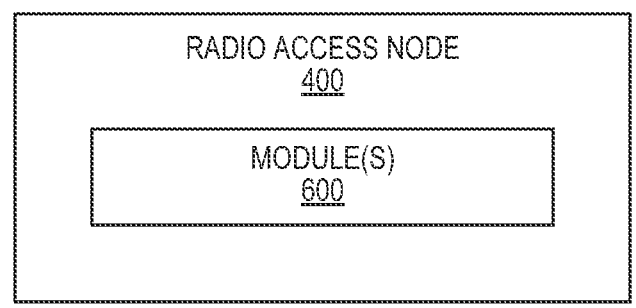
FIG. 6 is a schematic block diagram of the radio access node of FIG. 4 according to some other embodiments of the present disclosure.

FIG. 6 is a schematic block diagram of the radio access node 400 according to some other embodiments of the present disclosure. The radio access node 400 includes one or more modules 600, each of which is implemented in software. The module(s) 600 provide the functionality of the radio access node 400 described herein. This discussion is equally applicable to the processing node 500 of FIG. 5 where the modules 600 may be implemented at one of the processing nodes 500 or distributed across multiple processing nodes 500 and/or distributed across the processing node(s) 500 and the control system 402.

Figure 7:
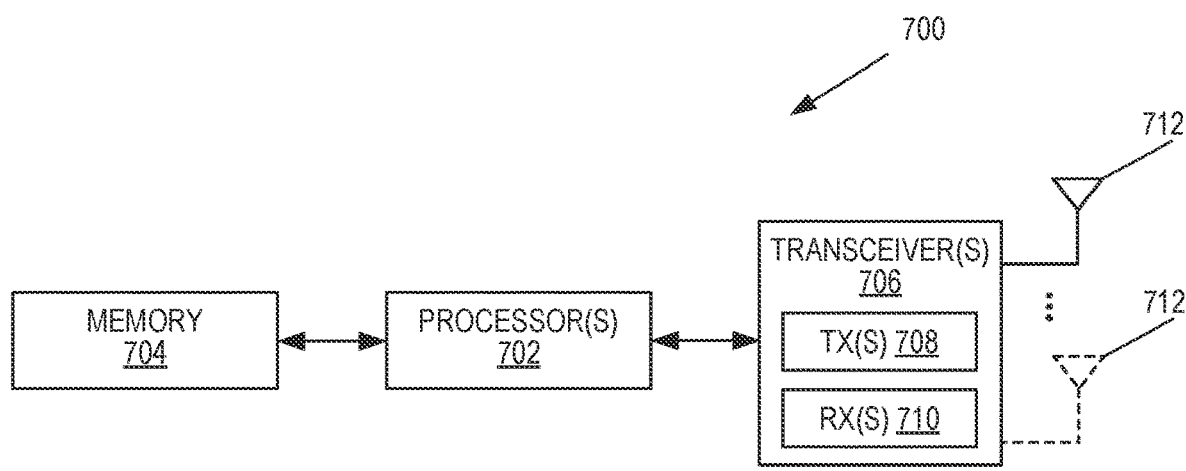
FIG. 7 is a schematic block diagram of a user equipment (UE) according to some embodiments of the present disclosure.

FIG. 7 is a schematic block diagram of a UE 700 according to some embodiments of the present disclosure. As illustrated, the UE 700 includes one or more processors 702 (e.g., CPUs, ASICs, FPGAs, and/or the like), a memory 704, and one or more transceivers 706 each including one or more transmitters 708 and one or more receivers 710 coupled to one or more antennas 712. The transceiver(s) 706 includes radio-front end circuitry connected to the antenna(s) 712 that is configured to condition signals communicated between the antenna(s) 712 and the processor(s) 702, as will be appreciated by one of ordinary skill in the art. The processors 702 are also referred to herein as processing circuitry. The transceiver(s) 706 are also referred to herein as radio circuitry. In some embodiments, the functionality of the UE 700 described above (e.g., the functionality of the UE described above, e.g., with respect to FIG. 2 and/or FIG. 3) may be fully or partially implemented in software that is, e.g., stored in the memory 704 and executed by the processor(s) 702. Note that the UE 700 may include additional components not illustrated in FIG. 7 such as, e.g., one or more user interface components (e.g., an input/output interface including a display, buttons, a touch screen, a microphone, a speaker(s), and/or the like and/or any other components for allowing input of information into the UE 700 and/or allowing output of information from the UE 700), a power supply (e.g., a battery and associated power circuitry), etc.

In some embodiments, a computer program including instructions which, when executed by at least one processor, causes the at least one processor to carry out the functionality of the UE 700 according to any of the embodiments described herein (e.g., the functionality of the UE described above, e.g., with respect to FIG. 2 and/or FIG. 3) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 8:
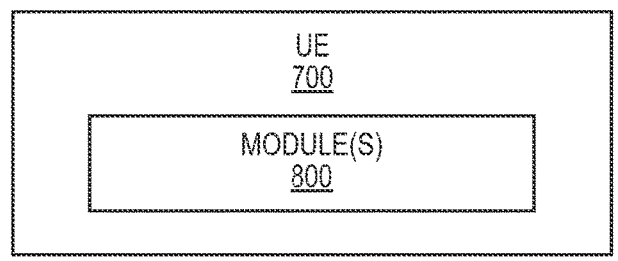
FIG. 8 is a schematic block diagram of the UE of FIG. 7 according to some other embodiments of the present disclosure.

FIG. 8 is a schematic block diagram of the UE 700 according to some other embodiments of the present disclosure. The UE 700 includes one or more modules 800, each of which is implemented in software. The module(s) 800 provide the functionality of the UE 700 described herein (e.g., the functionality of the UE described above, e.g., with respect to FIG. 2 and/or FIG. 3).

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like.

The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

While not being limited thereto, some example embodiments of the present disclosure are provided below.

Embodiment 1: A method performed by a wireless device (112) of a cellular communications system (100) to determine timing advance, TA, validity, the method comprising:
  obtaining (200) a TA for a cell (104, 108) of the cellular communications system (100);
  determining (202) that none of a predefined set of TA validation mechanisms are configured; and
  responsive to determining (202) that none of the predefined set of TA validation mechanisms are configured, determining (204) that the TA is valid for an entirety of the cell (104, 108).

Embodiment 2: The method of embodiment 1, wherein the predefined set of TA validation mechanisms comprises one or more optional TA validation mechanisms.

Embodiment 3: The method of embodiment 1, further comprising performing (206) one or more uplink transmissions using the TA.

Embodiment 4: The method of embodiment 3, wherein performing (206) the one or more uplink transmissions using the TA comprises performing (206) the one or more uplink transmissions on one or more preconfigured uplink resources.

Embodiment 5: A wireless device (112) of a cellular communications system (100) enabled to determine timing advance, TA, validity, the wireless device (112) comprising processing circuitry (702) coupled to a memory (704), the processing circuitry configured to:
  obtain (200) a TA for a cell (104, 108) of the cellular communications system (100);
  determine (202) that none of a predefined set of TA validation mechanisms are configured; and
  responsive to determining (202) that none of the predefined set of TA validation mechanisms are configured, determine (204) that the TA is valid for an entirety of the cell (104, 108).

Embodiment 6: The wireless device (112) of embodiment 5, wherein the processing circuitry (702) is further configured to perform the method of any one of embodiments 2 to 4.

Embodiment 7: A method performed by a wireless device (112) of a cellular communications system (100) to determine timing advance, TA, validity, the method comprising:
  obtaining (300) a TA for a cell (104, 108);
  receiving (302) one or more configurations of a corresponding one or more TA validation mechanisms;
  receiving (304) a first timer;

determining (306) that the first timer is set to infinity; and
responsive to determining (306) that the first timer is set
to infinity (306):
  determining (308) that the TA is valid for an entirety of
    the cell (104, 108); and
  responsive to determining (306) that the TA is valid for
    the entirety of the cell (104, 108), disabling (308) the
    one or more TA validation mechanisms.

Embodiment 8: The method of embodiment 7, wherein the one or more TA validation mechanisms comprises one or more optional TA validation mechanisms.

Embodiment 9: The method of embodiment 7, wherein the first timer comprises a Preconfigured Uplink Resources, PUR, Time Alignment Timer.

Embodiment 10: The method of embodiment 7 further comprising, responsive to determining (306) that the first timer is set to infinity, performing (310) one or more uplink transmissions using the TA.

Embodiment 11: The method of embodiment 10, wherein performing (310) the one or more uplink transmissions using the TA comprises performing (310) the one or more uplink transmissions using the TA on one or more PUR resources.

Embodiment 12: The method of embodiment 7, further comprising:
  receiving (304) a second timer;
  determining (306) that the second timer is not set to
    infinity; and
  responsive to determining that the second timer is not set
    to infinity, interpreting (312) the second timer as an
    indication of how long the TA is considered valid.

Embodiment 13: The method of embodiment 12, further comprising, responsive to determining (306) that the second timer is not set to infinity, performing (314) one or more uplink transmissions using the TA while the second timer is running and the TA is valid as determined by a User Equipment, UE, (112) using the one or more TA validation mechanisms.

Embodiment 14: The method of embodiment 13, wherein performing (314) the one or more uplink transmissions using the TA comprises performing (314) the one or more uplink transmissions using the TA on one or more PUR resources.

Embodiment 15: A wireless device (112) of a cellular communications system (100) enabled to determine timing advance, TA, validity, the wireless device (112) comprising processing circuitry (702) coupled to a memory (704), the processing circuitry configured to:
  obtain (300) a TA for a cell (104, 108);
  receive (302) one or more configurations of a corresponding one or more TA validation mechanisms;
  receive (304) a first timer;
  determine (306) that the first timer is set to infinity; and
  responsive to determining (306) that the first timer is set
    to infinity (306):
    determine (308) that the TA is valid for an entirety of
      the cell (104, 108); and
    responsive to determining (306) that the TA is valid for
      the entirety of the cell (104, 108), disable (308) the
      one or more TA validation mechanisms.

Embodiment 16: The wireless device (112) of embodiment 15, wherein the processing circuitry (702) is further configured to perform the method of any one of embodiments 8 to 14.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
AP Access Point
ASIC Application Specific Integrated Circuit
CP Control Plane
CPU Central Processing Unit
DSP Digital Signal Processor
DoNAS Data over Non-Access Stratum
eNB Enhanced or Evolved Node B
EPS Evolved Packet System
FPGA Field Programmable Gate Array
gNB New Radio Base Station
IoT Internet of Things
LTE Long Term Evolution
M2M Machine-to-Machine
MME Mobility Management Entity
MPDCCH Machine-Type Communications Physical Downlink Control Channel
MTC Machine-Type Communications
NAS Non-Access Stratum
NB-IoT Narrowband Internet of Things
NPDCCH Narrowband Physical Downlink Control Channel
NPRACH Narrowband Physical Random Access Channel
NR New Radio
NRSRP Narrowband Reference Signal Received Power
OTT Over-the-Top
P-GW Packet Data Network Gateway
PRB Physical Resource Block
PUR Preconfigured Uplink Resources
RAM Random Access Memory
RAN Radio Access Network
ROM Read Only Memory
RRC Radio Resource Control
RRH Remote Radio Head
RSRP Reference Signal Received Power
SCEF Service Capability Exposure Function
SNR Signal-to-Noise Ratio
TA Timing Advance
TSG Technical Specification Group
UE User Equipment
UP User Plane
WID Work Item Description Those skilled in the art will recognize Improvements and modifications to the embodiments of the present disclosure. All such improvements and modifications are considered within the scope of the concepts disclosed herein.

What is claimed is:

1. A method performed by a wireless device of a cellular communications system to determine timing advance, TA, validity, the method comprising:
  obtaining a TA for a cell of the cellular communications system;
  determining that a configuration comprising signaling bits activating a TA validation mechanism of a predefined set of TA validation mechanisms has not been received from a network node; and
  responsive to determining that the configuration activating the TA validation mechanism of the predefined set of validation mechanisms has not been received, determining that the TA is valid for an entirety of the cell, wherein the TA validation mechanism is one of a Time Alignment Timer for idle mode, serving cell Reference Signal Received Power (RSRP) or Narrowband RSRP (NSRP) changes.

2. The method of claim 1, wherein the predefined set of TA validation mechanisms comprises one or more optional TA validation mechanisms.

3. The method of claim 1, further comprising performing one or more uplink transmissions using the TA.

4. The method of claim 3, wherein performing the one or more uplink transmissions using the TA comprises performing the one or more uplink transmissions on one or more preconfigured uplink resources.

5. A wireless device of a cellular communications system enabled to determine timing advance, TA, validity, the wireless device comprising processing circuitry coupled to a memory, the processing circuitry configured to:
   obtain a TA for a cell of the cellular communications system;
   determine that a configuration comprising signaling bits activating a TA validation mechanism of a predefined set of TA validation mechanisms has not been received from a network node; and
   responsive to determining that the configuration activating the TA validation mechanism of the predefined set of TA validation mechanisms has not been received, determine that the TA is valid for an entirety of the cell, wherein the TA validation mechanism is one of a Time Alignment Timer for idle mode, serving cell Reference Signal Received Power (RSRP) or Narrowband RSRP (NSRP) changes.

6. The wireless device of claim 5, wherein the predefined set of TA validation mechanisms comprises one or more optional TA validation mechanisms.

7. The wireless device of claim 5, wherein the processing circuitry is further configured to cause the wireless device to perform one or more uplink transmissions using the TA.

8. The wireless device of claim 7, wherein, in order to perform the one or more uplink transmissions using the TA, the processing circuitry is further configured to cause the wireless device to perform the one or more uplink transmissions on one or more preconfigured uplink resources.

9. A method performed by a wireless device of a cellular communications system to determine timing advance, TA, validity, the method comprising:
   obtaining a TA for a cell;
   receiving one or more configurations comprising signaling bits corresponding to one or more activations of TA validation mechanisms;
   receiving a first timer;
   determining that the first timer is set to infinity; and
   responsive to determining that the first timer is set to infinity:
      determining that the TA is valid for an entirety of the cell;
      responsive to determining that the TA is valid for the entirety of the cell, disabling the one or more TA validation mechanisms; and
   receiving a second timer;
   determining that the second timer is not set to infinity; and
   responsive to determining that the second timer is not set to infinity, interpreting the second timer as an indication of how long the TA is considered valid, wherein the TA validation mechanism is one of a Time Alignment Timer for idle mode, serving cell Reference Signal Received Power (RSRP) or Narrowband RSRP (NSRP) changes.

10. The method of claim 9, wherein the one or more TA validation mechanisms comprises one or more optional TA validation mechanisms.

11. The method of claim 9, wherein the first timer comprises a Preconfigured Uplink Resources, PUR, Time Alignment Timer.

12. The method of claim 9 further comprising, responsive to determining that the first timer is set to infinity, performing one or more uplink transmissions using the TA.

13. The method of claim 12, wherein performing the one or more uplink transmissions using the TA comprises performing the one or more uplink transmissions using the TA on one or more PUR resources.

14. The method of claim 9, further comprising, responsive to determining that the second timer is not set to infinity, performing one or more uplink transmissions using the TA while the second timer is running and the TA is valid as determined by a User Equipment, UE, using the one or more TA validation mechanisms.

15. The method of claim 14, wherein performing the one or more uplink transmissions using the TA comprises performing the one or more uplink transmissions using the TA on one or more PUR resources.

\* \* \* \* \*